(No Model.) 2 Sheets—Sheet 1.
H. GEIGER.
WAGON RACK.
No. 318,100. Patented May 19, 1885.
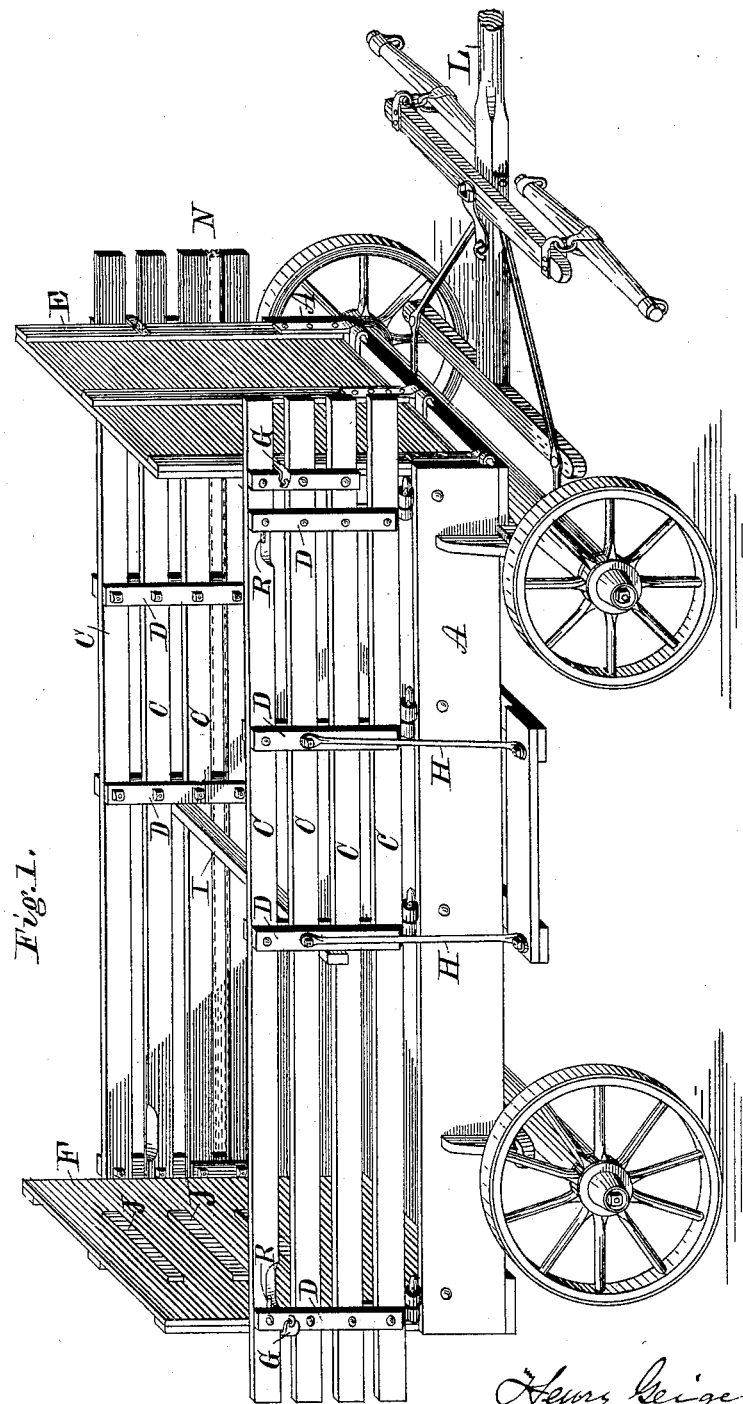
Witnesses
G. M. Gridley
Matthew Schinner
Henry Geiger
Inventor
By Erwin Benedict
Attorneys.

(No Model.) 2 Sheets—Sheet 2.
H. GEIGER.
WAGON RACK.
No. 318,100. Patented May 19, 1885.
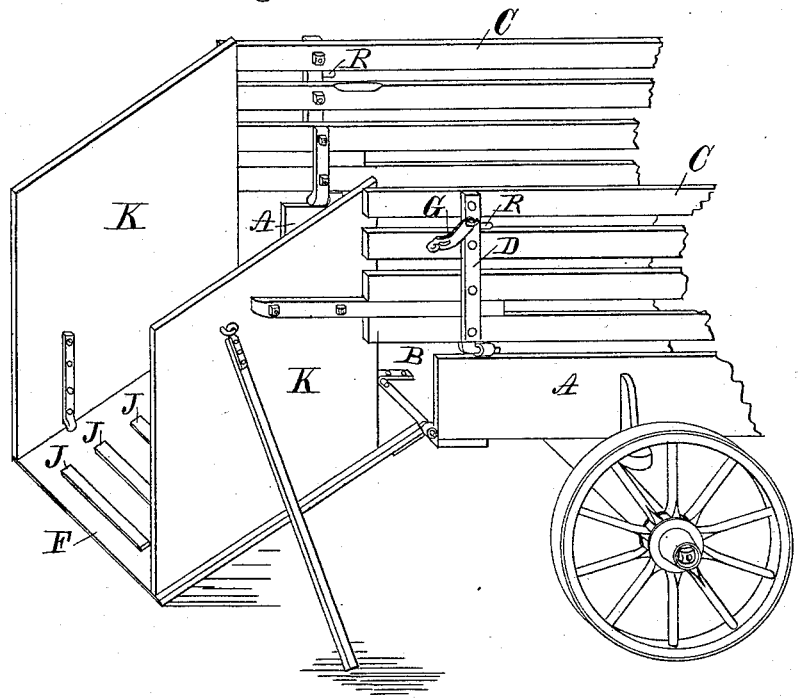
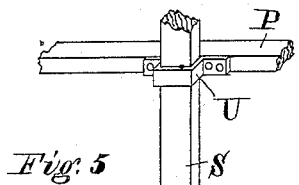
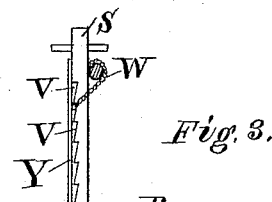
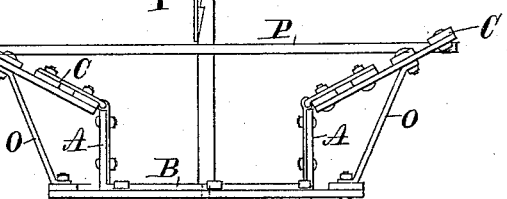
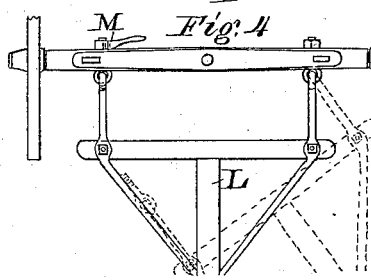
Witnesses
G. M. Gridley
Matthew Schinner
Henry Geiger
Inventor
By Erwin W. Benedict
Attorneys

UNITED STATES PATENT OFFICE.

HENRY GEIGER, OF FOX LAKE, WISCONSIN.

WAGON-RACK.

SPECIFICATION forming part of Letters Patent No. 318,100, dated May 19, 1885.

Application filed September 19, 1884. (No model.)

*To all whom it may concern:*

Be it known that I, HENRY GEIGER, a citizen of the United States, residing at Fox Lake, in the county of Dodge and State of Wisconsin, have invented certain new and useful Improvements in Wagon-Racks; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention, to be hereinafter distinctly claimed, relates to improvements in wagon-racks whereby the vehicle is especially adapted for transporting cattle, sheep, hogs, hay, stalks, corn in the ear, roots, vegetables, and other farm products, being provided with special appliances for facility in loading and unloading live-stock, &c.

In the drawings, Figure 1 is a perspective view of a farm-truck with my rack thereon in the shape intended especially for transporting stock. Fig. 2 is a view of the rear end of my rack with the end-gate let down for a bridge and having side pieces or guards thereto as used in loading live-stock. Fig. 3 is a front view of my rack changed from the form shown in Fig. 1, and adapted for transporting hay, stalks, and bulky products. Fig. 4 indicates a way of removing the wagon-tongue to permit the letting down of the front end-gate when desired for unloading stock, &c. Fig. 5 is a detail.

The same letters refer to like parts in all the views.

A A are the side-boards, and B is the bottom, of a wagon-box constructed in the manner common with farm-wagons.

To the side-boards A A, at their upper edge, are removably hinged the side rails, C C. These side rails are as long as or longer than the sides of the box, and are fastened together in sets of two or more, with spaces between them but parallel with each other, by the rigid cross-bars D D, or other equivalent means, one set of rails being used on each side of the wagon. The end-gates E and F are at their respective lower ends removably hinged, the one at the front and the other at the rear to the bottom of the box, and when the sets of side rails and these end-gates are in an upright position, as shown in Fig. 1, the side rails are fastened to the end-gates, and the whole rack held together and strengthened by one or more hasps, G, at each place of meeting of said side rails and end-gates. The side rails are supported and held in a vertical position by the brace-rods H H, which rods at their lower extremities rest upon and are supported by a bracket or cross-bars, which are affixed to and project at each side from the bottom of the box, and at their upper extremities said rods rest against and are affixed to the side rails, said rods being fastened at their extremities by bolts or other equivalent means.

When desired, the space within the rack may be divided into two or more parts by one or more bars, I, placed across the wagon from side to side through the spaces between the side rails at such point as desired.

For the purpose of convenience in loading stock into the wagon, the rear gate, F, being unhasped, the top may be swung over and down upon the ground, forming a bridge from the ground to the bottom of the wagon, as shown in Fig. 2. The upper and inner side of this gate is furnished with cleats J J, to prevent the slipping of the feet of stock when on the bridge.

K K are wings or guards placed and supported at the two sides of this end-gate bridge to guide and guard stock when passing up or down the bridge. If desired, the front end-gate may in a similar manner be let down to serve as a bridge for the passage of stock.

To permit the letting down the front gate as a bridge, one of the eyebolts by which the tongue L is attached to the front axle is provided with a hand-nut, M, by which this bolt may be readily unfastened and removed from the axle, and the tongue may then be swung around to one side out of the way, as indicated by dotted lines in Fig. 4. By inserting longitudinal rails N (indicated in Fig. 1 by dotted lines) within and so as to fill up the spaces between said side rails, this rack is made a comparatively tight high wagon-box, adapted to the transportation of small and light but bulky material—such as chaff, husks, or even corn in the ear.

To adapt this rack for the transportation of hay, straw, stalks, or other coarse bulky material, I unhinge and remove both front and rear end-gates, E and F, and remove the brace-rods H H, and swing the top of the sets of side rails outward and downward to the position shown in Fig. 3, and support and retain the rails in that position by the shorter brace-rods O O, put in the place of the rods H H. To further support and strengthen the rails in this position, I insert one or more cross-rails, P, between the rails of the set from side to side of the rack, and provide the cross-bars D D with pintles R R and the rails P with holes adapted to receive said pintles when said rail is so placed in position within said spaces and across said rack.

S is a standard, set up at the front end of the rack and retained and supported by its lower extremity, being tenoned and keyed in an aperture, T, adapted therefor, in the bottom of the box and held to the front rail P by a strap-loop, U. The upper part of this standard S is provided with a series of notches, V V, with upper retaining-edges adapted to catch and hold a rope-loop, W, around said standard, and which loop slides freely up or down the same when held horizontally around said standard; but which, when drawn on the opposite outside diagonally upward across said standard, catches in and holds upon the said notches, said loop being adapted to receive and hold the front end of a binding-pole. The loop W is kept from falling off by the guard Y.

What I claim as new, and desire to secure by Letters Patent, is—

1. The wagon-rack consisting of side rails removably affixed to the top of the side-boards of a wagon-box, and end-gates removably affixed to the wagon-box and adapted to serve as end-gates to the rack, and also one or both adapted to serve as a bridge from the ground to the wagon-box, substantially as described.

2. The wagon-rack consisting of the side rails, C C, removably hinged to the top of the side-boards of the wagon-box, and the end-gates E and F, removably hinged to the bottom of the wagon-box and adapted to serve as ends to the rack, and one or both adapted to serve as a bridge from the ground to the wagon-box, substantially as set forth.

3. The wagon-rack consisting of two or more side rails, C C, rigidly held together by the cross-bars D D, removably hinged to the top of the side-boards of the wagon-box and supported by the rod-braces H H, and the end-gates E and F, removably hinged to the bottom of the wagon-box and adapted to serve as end-gates to the wagon-rack and as bridges from the ground to the wagon-box, substantially as set forth.

4. In a wagon-rack, the combination of a rack having end-gates E and F and side rails with spaces between the rails with the space-filling rails N, substantially as set forth.

5. In a wagon-rack, the combination of a rack having side rails, C C, and end-gates E and F, which end-gates, either one or both, are adapted to serve as bridges from the ground to the wagon-box, with the wings or guards K K, substantially as set forth.

In testimony whereof I affix my signature, in presence of two witnesses, this 15th day of September, 1884.

HENRY GEIGER.

Witnesses:
WM. N. HAMILTON,
G. B. WELLINGTON.